United States Patent [19]
Hjern et al.

[11] Patent Number: 5,812,948
[45] Date of Patent: Sep. 22, 1998

[54] ARRANGEMENT IN A TELECOMMUNICATIONS SYSTEM HAVING AUTOMATIC UNIVERSAL PERSONAL TELECOMMUNICATION SERVICES REGISTRATION FEATURES

[75] Inventors: Magnus Hjern, Smygehamn; Peter Olanders, Lomma, both of Sweden

[73] Assignee: Telia AB, Farsta, Sweden

[21] Appl. No.: 669,388

[22] PCT Filed: Dec. 30, 1994

[86] PCT No.: PCT/SE94/01267

§ 371 Date: Aug. 22, 1996

§ 102(e) Date: Aug. 22, 1996

[87] PCT Pub. No.: WO95/20864

PCT Pub. Date: Aug. 3, 1995

[30] Foreign Application Priority Data

Jan. 28, 1994 [SE] Sweden ................................. 9400116

[51] Int. Cl.[6] .................................................. H04Q 7/20
[52] U.S. Cl. ...................... 455/435; 455/432; 455/411; 455/418
[58] Field of Search ........................... 455/435, 436–440, 455/433, 411, 415, 432, 418, 462, 464, 465, 461; 379/89; 380/21, 23; 370/331

[56] References Cited

U.S. PATENT DOCUMENTS

| | | | |
|---|---|---|---|
| 5,003,629 | 3/1991 | Ness-Cohn et al. | 455/32.1 |
| 5,557,654 | 9/1996 | Maenpaa | 455/411 |
| 5,588,042 | 12/1996 | Comer | 379/89 |
| 5,600,705 | 2/1997 | Maenpaa | 455/433 |

FOREIGN PATENT DOCUMENTS

| | | | |
|---|---|---|---|
| 665700 A1 | 8/1995 | European Pat. Off. | H04Q 7/24 |
| 01976 | 1/1994 | WIPO | H04B 7/26 |

*Primary Examiner*—Tommy P. Chin
*Assistant Examiner*—Vu Le
*Attorney, Agent, or Firm*—Oblon, Spivak, McClelland, Maier & Neustadt, P.C.

[57] ABSTRACT

A telecommunications system operates with a personal telephony function and a respective user has the capability of controlling offered personal telecommunications services. In the system, the user is represented by a unique identity (UPTN), which is used for identification and authenticity check of the user. Access to the telecommunications services can be established from a DECT portable which is involved in identification, authenticity check and registration in the telephone system. Availability of the services offered thus becomes more user friendly and the services and the DECT system become more attractive to the end users.

20 Claims, 3 Drawing Sheets

ARRANGEMENT IN A TELECOMMUNICATIONS SYSTEM HAVING AUTOMATIC UNIVERSAL PERSONAL TELECOMMUNICATION SERVICES REGISTRATION FEATURES

BACKGROUND OF THE INVENTION

The present invention relates to an arrangement in a telecommunications system which operates with the personal telephony function, here called UPT, where a user has the possibility of controlling/requesting offered personal telecommunications services and where, in the system, a unique identity, the so-called personal telephone number, here called UPTN, represents the user. The identity can be used for identifying and checking the authenticity/authenticating the user in the system.

Discussion of the Background

A flexible telecommunications system which combines functions of a wire-connected system and a mobile or cordless system is already known from Patent Specification WO 93/18606. The wire-connected network which is described in the document has the capability of receiving incoming telephone calls at an arbitrary location with the aid of central control. A subscriber belonging to a system which is described in the document has the capability of automatically registering himself with the wire-connected network with the aid of a cordless telephone. When the subscriber comes into the coverage area of a base unit, this automatically sends a registration signal to a central control unit. The system which is described in the document thus keeps a check on where a certain subscriber is located and the subscriber can select whether he wants to receive the call via the wire-connected network or the cellular network.

From American Patent Specification U.S. Pat. No. 5,077,790, a method for registering cordless telephones is already known. The system is assumed to contain a network control unit which contains, inter alia, a data base which stores the ID number of the telephones belonging to the system. Briefly, registration takes place in such a manner that the portable unit sends a registration signal which contains its ID number to the control unit via a base unit. The control unit responds to this request by sending an encrypted subscriber identity number to the portable unit if its ID number is found in the data base.

In American Patent Specification U.S. Pat. No. 4,833,704, a telephone system is shown which is divided into a number of service areas, each of which is connected to a wire-connected system. A subscriber belonging to a service area can move to another service area and automatically register himself in the new area via his cordless telephone in order to be able to send and receive calls in this area.

From European Patent Specification EP 546,467, a telecommunications system is known which combines a cordless system with a wire-connected system. There is the possibility for the user to be called in the wire-connected system via his personal telephone number in the cordless system. For the telecommunications system to be able to handle terminals in the wire-connected system as substitute for a cordless terminal, information about whether the position of the cordless terminal is picked up in the HLR is utilized.

It is thus already known to combine in different ways wire-connected telecommunications systems with some type of cordless system which is not constituted by DECT (Digital European Cordless Telecommunication).

There is a need for automatically obtaining UPT registration of a DECT portable. The UPT (Universal Personal Telecommunication) service is based on intelligence being introduced into the network through data bases so that the user can be provided with a personal number, that is to say the so-called UPT number UPTN. UPT is represented by a number of functions which make it possible for the user to control the personal telecommunications services in a uniform and flexible manner independently of which terminal, which network or which type of access is used for the occasion.

In the network, the user is represented by a unique identity, the personal telephone number, UPTN. The identity is used in identifying/authenticating a user, which ensures that operators, subscribers and end users are guaranteed a safe and reliable service.

The first implementations of UPT, however, will not be very user-friendly. Even if work is carried out for making it possible to store the identity in a smart card and to use this for identification and authentication, such a functionality will not be available on the market for a few years yet. In UPT phase 1, registration of, for example, incoming calls will be an almost intolerable button-pressing procedure. In later phases of UPT, presumably developed application cards will be part of the service, but even these will require contributions from the user. The conventional registration method in UPT also requires that a separate telephone call is set up, which entails disadvantages in the form of extra costs and traffic load in the network.

SUMMARY OF THE INVENTION

The problem which the present proposal intends to solve is found in the cumbersome procedures which are part of the early UPT-based services. The proposal describes how an automatic registration method can make DECT-access to UPT services more user friendly and UPT services in combination with DECT more attractive to the end user.

Digital European Cordless Telecommunications, DECT, is a standard which has been developed in ETSI for cordless telecommunication within the public domain, for business exchanges and for radio access in the local area network. In the overwhelming majority of installations, the DECT system will be linked to the public PSTN or ISDN telecommunications network, either through PABXs or through direct connections. By this means, DECT can thus offer an effective access to UPT for a large number of potential users.

DECT is a very flexible standard and contains, among other things, a user module called DECT Authentication Module, or DAM card. There is also a whole battery of functions defined for registration, authentication, encryption, etc. These can be utilized for automatically registering the DECT subscriber for UPT services in a user-friendly and flexible manner.

The fixed side of DECT consists of so-called Radio Fixed Parts, RFPs, and a central unit, Central Fixed Parts, CFP. Together, they form a Fixed Part, FP. RFPs coupled to a common central unit constitute a so-called "cluster" and can serve a coverage area (see FIG. 1). This DECT system is owned or administered by an operator who can be either a public telecommunications operator or can be privately owned. In the latter case, certain contracts will be needed for coupling to the public network.

Each FP continuously sends out information via its "broadcast" channels, in the Q-channel system information, RFPI, for being able to, among other things, identify the base station and its service area, Location Area, LA, and in the Q or N channel, the access rights, Access Rights Identities, ARIs are identified which a Portable Part, PP, or portable, needs for being able to communicate with the base.

In more advanced applications local data bases Home Data Base, HDB, and Visitors Data Base, VDB, can also belong to the CFP of the system, but their intelligence can also be implemented directly in the CFP.

A PP, which has the same set of access rights, Portable Access Rights Key, PARK, as the FP, can communicate with the DECT system. As soon as the PP senses that it has entered a new LA it attempts to establish contact with the fixed side and to carry out registration. In this proposal, this functionality is utilized for combining the personal mobility in UPT with the terminal mobility which is offered via the DECT technique, in a manner which is very advantageous for users and operators.

The present proposal provides, among other things, instructions on how automatic registration of incoming and outgoing calls can be carried out for a DECT portable. The text below describes, how this registration can be carried out depending on what inbuilt UPT functionality is found in the portable.

The invention specifies how automatic registration of incoming and outgoing calls can be carried out without there being a need for direct call setting-up towards UPT. The different alternatives can be utilized independently of one another or alternatively determined by the UPT functionality which is stored in the calling DECT portable.

The feature which can mainly be considered more concretely to characterize an arrangement according to the invention is that access to the said telecommunications services can be established from a DECT portable by means of which identification, authenticity check and registration in the telecommunications system can be effected with the aim of making the accessibility of the services offered in the UPT function more user friendly and making the said telecommunications services and DECT more attractive to the end user.

In one embodiment of the concept of the invention, both incoming and outgoing calls can be automatically registered with the aid of a respective DECT portable. In the embodiment, registration can be effected without need for direct call setting-up towards UPT, even if such call setting-up can be carried out for speeding up the functions. Further embodiments of the concept of the invention can be found in the patent claims following.

The above provides a solution which combines user friendliness and procedures in the DECT system with an automatic registration method in UPT. In this context, one can start from the traditional methods which consisted of the user himself having to initiate the call setting-up and providing the network with registration information. The invention also solves the above in an all-embracing and flexible manner so that, generally speaking, each DECT terminal can be utilized for access to UPT. The invention can be implemented with network functions which will be found accessible in UPT and DECT. The invention can be used in all applications where the DECT system can offer a user access to the fixed network and thus to UPT services. The principles of how automatic registration is carried out are based on the functionality which is inherent in a DECT portable and the services which are offered by the operators of the DECT system and the public telecommunications operators which offer a UPT personal number via the telecommunications network.

BRIEF DESCRIPTION OF THE DRAWINGS

A currently proposed embodiment of an arrangement which exhibits the characteristics significant to the invention will be described below, at the same time referring to the attached drawings, in which.

DESCRIPTION OF THE PREFERRED EMBODIMENTS

In the DAM card are stored user-specific identities, keys for authentication, encryption and functionality for being able to identify a DECT system. A DAM card for a user with personal number in UPT should at least be able to store UPTN and security codes in the form of a Personal Identification Number, $PIN_{UPT}$ code. For security reasons, a UPT registration requires that the PIN code is used, but since a user has already in advance authenticated himself with the DAM card, it is possible for this code to be stored in advance.

The DAM card, however, is not obligatory. A portable can also be programmed in advance for storing the same functionality internally. The text below describes how the DAM card can be used, but the same functionality can be offered with a preprogrammed portable.

When the user switches on the terminal, a local authentication occurs towards the DAM card with the aid of the $PIN_{DAM}$ code. This is the personally defined access code of the user and the only number he needs to remember. All further authentication towards the DECT system and background UPT occurs via an automatic arrangement built into the portable and the fixed DECT system.

To be able to reach a specific DECT user, a set of International Portable User Identities, IPUIs, is defined. These identities can also be of several different types within the different environments where the DECT user can utilize his subscription(s). A combination of PARK and IPUI, an IPUI/PARK$_{\{y\}}$ pair gives the DECT user a unique identity. For public access, ARI/PARK class C and IPUI type S are defined. In this solution, this is defined to contain UPT access according to FIG. 2. This figure is self-descriptive.

A portable which has analyzed the system information from the base and drawn the conclusion that it can be granted entry automatically attempts to tell the base that it is located within the coverage area and can thus "lock itself in".

In connection with this, the user receives a request on whether registration towards UPT will be carried out. An affirmative answer, either in the form of the user acknowledging a message on the display or the PP being preprogrammed (possibly by the user) for generating this functionality itself, leads to the registration procedure being initiated. This is done by the PP initiating a procedure for Location Registration (see FIG. 2). If the user does not wish to register towards UPT, the active IPUI must be deactivated and another stored identity must be used instead.

1. The portable sends a message to FP with information to the effect that it is located within the coverage area. In the DAM card or in the software of the portable, the UPT identity is stored. This is transferred to the FP together with the predefined security code $PIN_{UPT}$.

Figure 1:
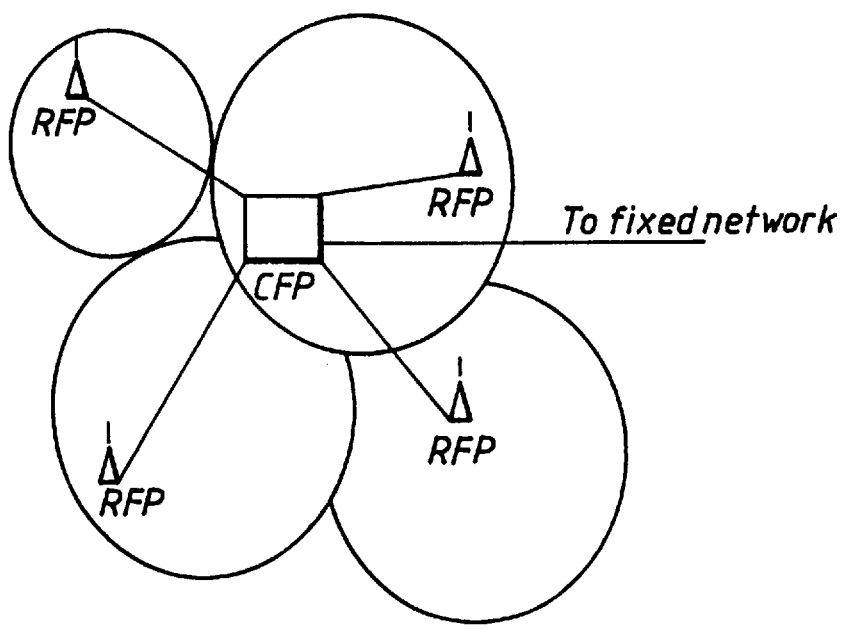
FIG. 1 shows in a basic diagram form the configuration of parts of a DECT system.
Figure 3:
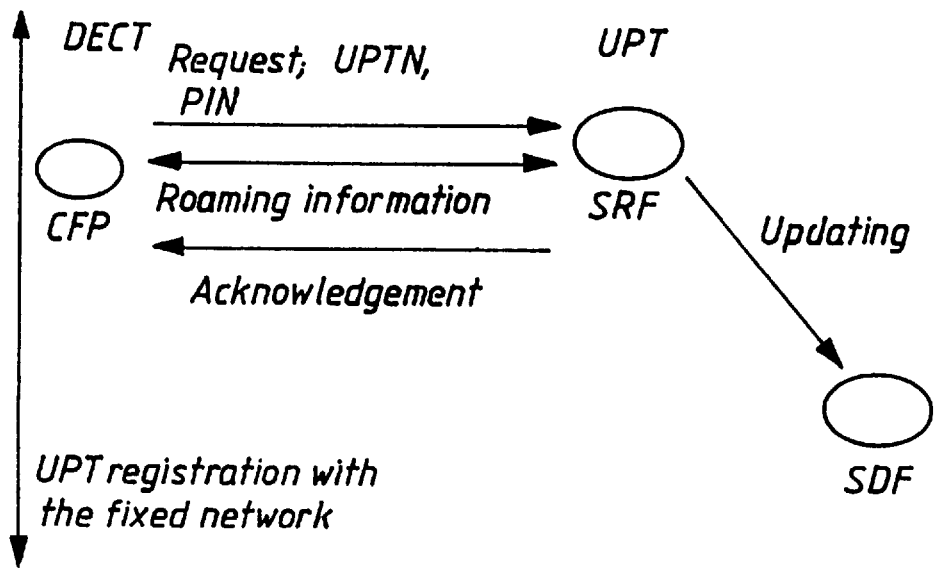
FIG. 3 shows in principle the registration function between FP and UPT nodes.

2. The FP carries out a number analysis of the telephone number which has been sent via the IPUI. If the CFP identifies the content in the IPUI as a personal number in the UPT and it can handle a UPT registration, the DECT system will automatically attempt to initiate a registration procedure of the user with the background fixed network (FIG. 3).

3. The PP gets the acknowledgement from the fixed side that the identity can be handled together with information on "Location area" and an alphanumeric message that UPT registration is occurring.

If the FP cannot handle UPT registration or does not accept the portable for another reason, a negative acknowledgement is sent instead. A failure leads to the fact that no further communication can be carried out between the units with this identity, that is to say UPT registration cannot be carried out.

4. On reception of a positive acknowledgment, the portable indicates to the user that UPT registration is occurring. At this stage, the user can speed up the procedure by making, for example, an outgoing call which directly registers the portable for UPT. If the user instead chooses to wait, the portable is not registered for incoming calls until the FP has been given information about it (step 5).

5. After registration with the network has been carried out for one or more simultaneous portables (see below), the FP sends to it/them a one-way message with alphanumeric information about the outcome of the registration. A positive acknowledgement, for example in the form of "UPT OK", gives the user an indication that the registration procedure has been successfully carried out. A failure of registration is indicated, for example, by the message "UPT registration unsuccessful".

The reason for the FP not immediately updating each portable which makes a request is that this can lead to a traffic load in the network which is not desirable for the operator. Instead, the FP can wait for a predetermined time interval (for example 5 minutes) and execute the requests of several portables at the same time. Since the UPT registration can also be linked to a charge for the subscriber, a collected registration of several portables can be one way of sharing the registration costs.

Before the FP acknowledges that registration is carried out and the portable can indicate this to the user, transfer of the UPTN and $PIN_{UPT}$ from CFP, updating of the data bases in the network and transfer of roaming information, see FIG. 3, occurs.

Figure 4:
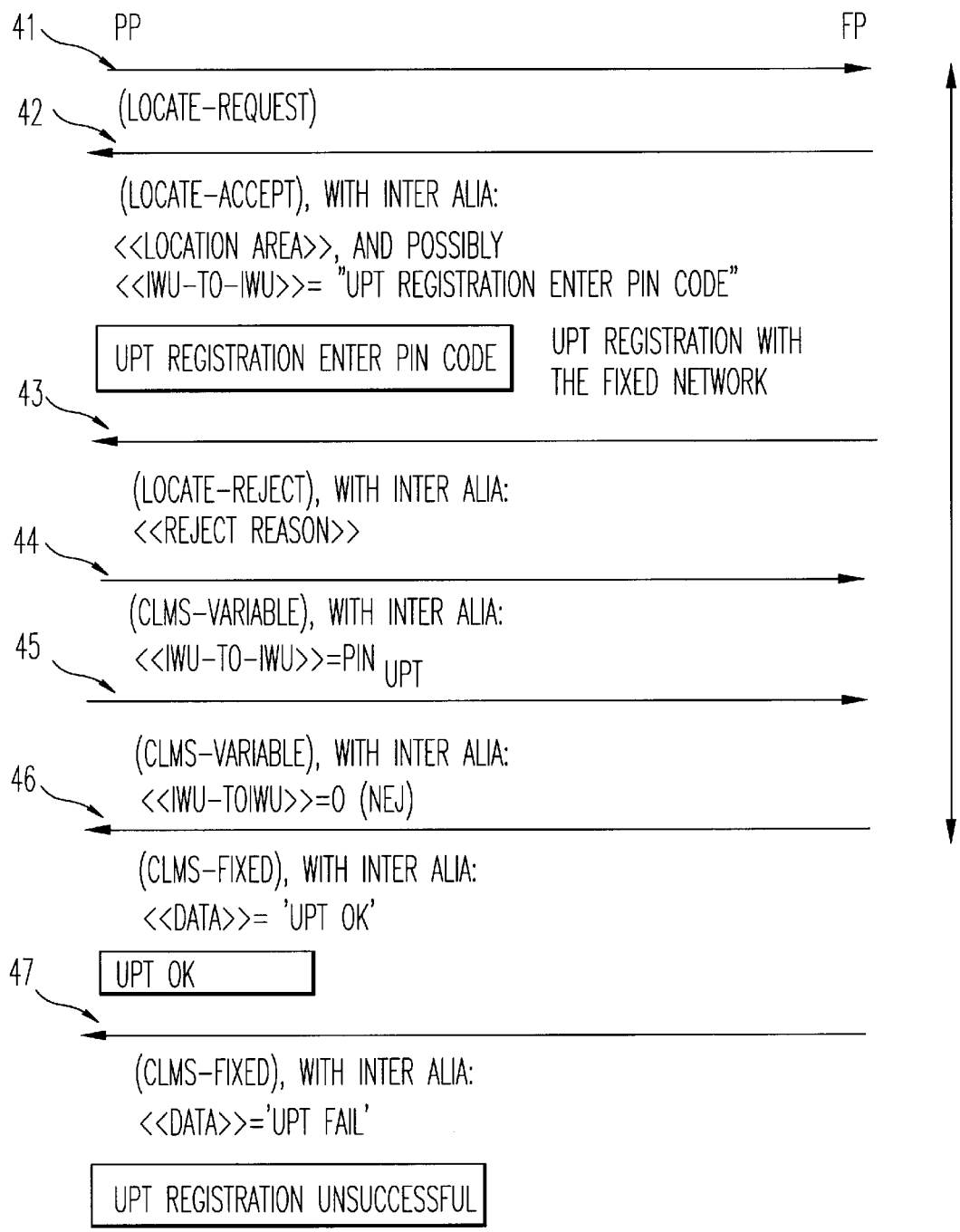
FIG. 4 shows a flow chart of a second function in the arrangement.

A user who wishes to have his portable automatically registered with the UPT without having the possibility of storing UPT identities needs to make an agreement about this with his local DECT operator in advance. The operator then stores the identity of the portable in his local data base with an indication that registration with UPT will be carried out. Reference is made to FIG. 4.

When the portable enters into a new coverage area (Location area) and initiates a registration with the local DECT system, the following happens in connection with Location registration (see FIG. 4):

1. A normal registration procedure is initiated towards the local DECT system.

2. CFP carries out a number analysis of IPUI. If this is found stored in its own data base as a user who wishes registration with DECT, the FP responds with information about the "Location area" together with an alphanumeric request that the user should enter the PIN code.

An FP which does not provide access to the UPT acknowledges the updating request of the portable in accordance with normal DECT procedures.

If the FP, on the whole, does not accept the portable which requests access to the system, a negative acknowledgement is sent. No further communication can be carried out between the units which the active IPUI.

3. The user enters his personal $PIN_{UPT}$ code which is transferred to the fixed side in a special message. For a user who does not wish to register with the UPT, a predefined value, for example 0, is sent as PIN code and is recognized by the FP which breaks off registration with the UPT. However, this portable still has normal DECT access to the local system, including the other access capabilities offered via this.

4. Registration takes place. The user can wait for the registration or speed it up by initiating an outgoing call which directly registers the portable for UPT.

5. After registration with the network has been carried out for one or more portables, the FP indicates this as at point 5 above.

The CFP updates the portable towards the UPT in accordance with the above description.

Figure 2:
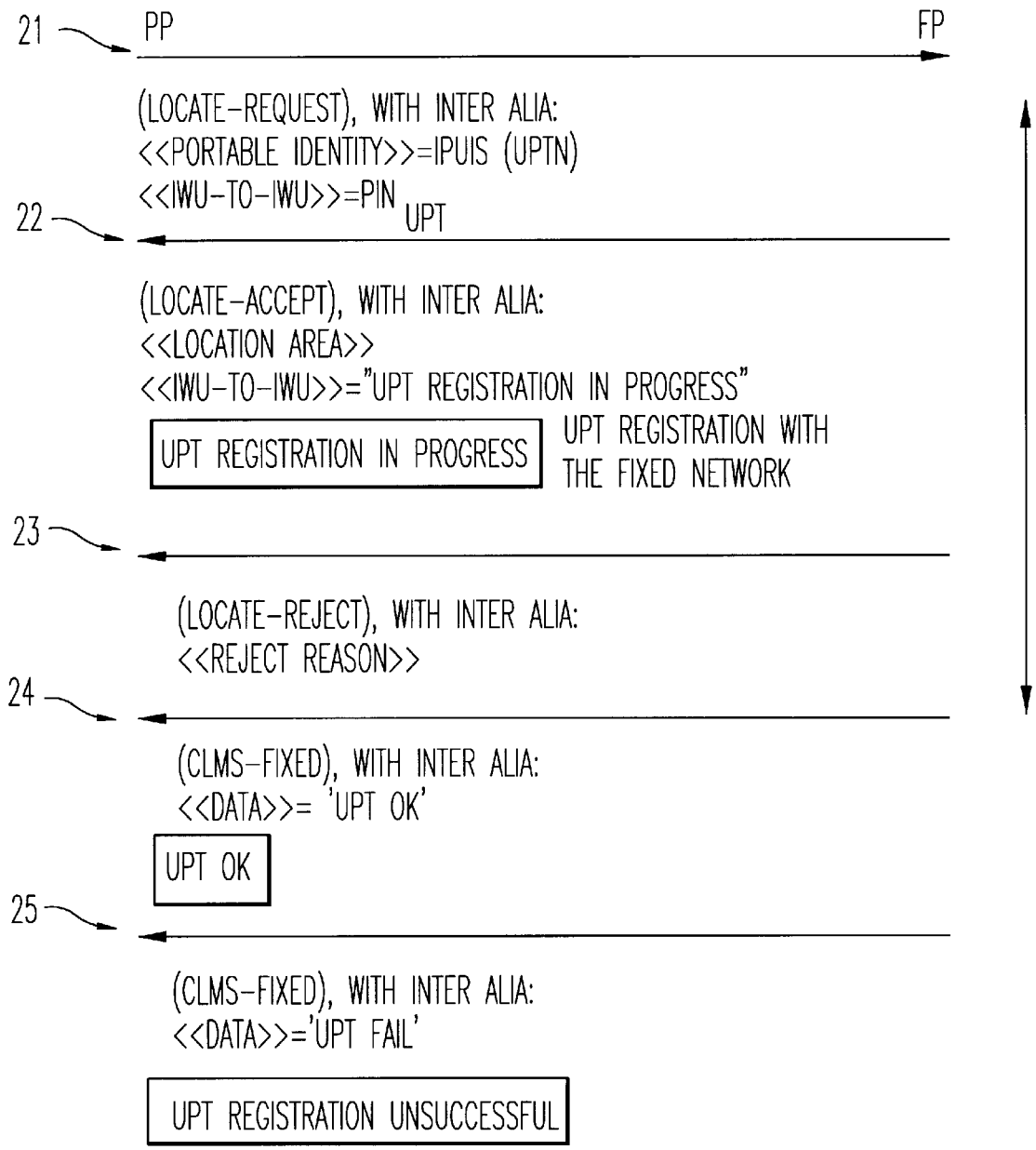
FIG. 2 shows a flow chart of a first function in the arrangement.

In FIG. 2, the term PUT represents Portable User Type, i.e. routing number to the UPT service, and UPTN represents UPT Personal Telecommunication Number.

In the flow chart of FIG. 2, signal representing arrows 21–25 illustrate the system:

Arrow 21 represents a LOCATE-REQUEST-function with inter alia:

<<Portable identity>>=IPUIs(UPTN),

<<IWU-TO-IWU>>=$PIN_{UPT}$.

Arrow 22 represents a LOCATE-ACCEPT-function with inter alia:

<<Location area>>

<<IWU-TO-IWU>>="UPT registration in progress", i.e. UPT registration with the fixed network.

Arrow 23 represents a LOCATE-REJECT-function with inter alia:

<<Reject reason>>

Arrow 24 represents a CLMS-FIXED-function with inter alia:

<<Data>>="UPT OK"

Arrow 25 represents a CLMS-FIXED-function with inter alia:

<<Data>>="UPT Fail"

In FIG. 4, the term PUT represents Portable User Type, i.e. routing number to the UPT service, and PUN represents DECT Portable User Number.

In the flow chart of FIG. 4, signal representing arrows 41–47 illustrate the alternative system:

Arrow 41 represents a LOCATE-REQUEST-function

Arrow 44 represents a LOCATE-ACCEPT-function with inter alia:

<<Location area>>, and possibly

<<IWU-TO-IWU>>="UPT registration enter PIN code", i.e. UPT registration with the fixed network.

Arrow 43 represents a LOCATE-REJECT-function with inter alia:

<<Reject reason>>

Arrow 44 represents a CLMS-VARIABLE-function with inter alia:

<<IWU-TO-IWU>>=$PIN_{UPT}$

Arrow 45 represents a CLMS-VARIABLE-function with inter alia:

<<IWU-TO-IWU>>=0(No)

Arrow 46 represents a CLMS-FIXED-function with inter alia:

<<Data>>="UPT OK"

Arrow 47 represents a CLMS-FIXED-function with inter alia:

<<Data>>="UPT Fail"

In this embodiment, the user uses an IPUI type S for normal public access.

The invention is not limited to the embodiment shown above as example but can undergo modifications within the scope of the patent claims following and the concept of the invention.

We claim:

1. A telecommunication system comprising:

a user-operated DECT telephone configured to perform a personal telephony f unction, a user of said DECT telephone having been assigned a universal personal telephone number that allows for an identification of the user and an authenticity check of the user to be made;

a fixed part of a DECT system configured to communicate over a radio link with said DECT telephone so a s to connect said DECT telephone with a public switch telephone network, wherein access from said DECT telephone being established with a universal personal telecommunications service as controlled by said user employing said DECT telephone, said DECT telephone being configured to determine when said user enters a new location area, and provide to said fixed part with a registration message including a Portable Access Rights Key and International Portable User's Identities, said fixed part being configured to receive said Portable Access Rights Key and International Portable User's Identities and make available said Portable Access Rights Key and International Portable User's Identities for universal access in said universal personal telecommunications service to said DECT telephone for reaching said user in said new location area.

2. The system of claim 1, wherein:

incoming and outgoing calls to said DECT telephone are automatically registered using said DECT telephone.

3. The system of claim 2, wherein:

registration of said user is effected without a direct call from said DECT telephone to said fixed part so as to establish, for said user of DECT telephone, universal personal telecommunication service.

4. The system of claim 2, wherein:

said DECT telephone is configured to allow said user to optionally register for universal personal telecommunication service.

5. The system according to claim 2, wherein:

said DECT telephone comprises, means for analyzing system information from a base station, means for obtaining access and locking the DECT telephone to a connection with the base station, said base station having means for sending a request message to the DECT telephone if universal personal telecommunication services are requested by said user, said DECT telephone also having means for answering said request message, and a storage mechanism configured to store the International Portable User's Identities, said fixed part comprising means for identifying a content of the International Portable User's Identities as a personal number associated with universal personal telecommunications services such that the DECT telephone and fixed part automatically attempt to initiate a registration procedure with the public switch telephone network.

6. The system according to claim 5, wherein:

the DECT telephone, upon receipt of a positive acknowledgment, employs means for indicating to the user that a universal personal telecommunications services registration process is presently ongoing, and employs means for respectively providing an acknowledgment of completion or not completion of a successful or unsuccessful registration.

7. The system according to claim 2, wherein:

said fixed part comprises a local data base having means for storing an identity of a user of the DECT telephone with a corresponding indication as to whether the user requests automatic registration with universal personal telecommunications services when said DECT telephone informs said fixed part of the DECT telephone's local area.

8. The system of claim 2, wherein:

upon entry into the new location area, the DECT telephone automatically initiates a registration with the fixed part resulting in a normal registration process with a local DECT system, said fixed part configured to request the personal identification code of the user on acceptance of the DECT telephone into the local DECT system and that upon providing the PARK and International Portable User's Identities from the user, the DECT telephone being registered for universal personal telecommunications service.

9. The system of claim 1, wherein:

registration of said user is effected without a direct call from said DECT telephone to said fixed part so as to establish, for said user of DECT telephone, registration with said universal personal telecommunication service.

10. The system according to claim 9, wherein:

said DECT telephone is configured to allow said user to optionally register for universal personal telecommunication service.

11. The system according to claim 10, wherein:

registration of said user is effected without a direct call from said DECT telephone to said fixed part so as to establish, for said user of DECT telephone, universal personal telecommunication service.

12. The system according to claim 9, wherein said DECT telephone is configured to operate with an authentication module having contained therein a personal identification code, said personal identification code used for local authentication with said fixed part, said personal identification code being an only number needed by the user to initiate said registration, and further authentication with the fixed part and universal personal telecommunication service being performed by automatic communication between the DECT telephone and the fixed part, initiated by said DECT telephone.

13. The system according to claim 9, wherein:

said fixed part comprises a local data base having means for storing an identity of a user of the DECT telephone with a corresponding indication as to whether the user requests automatic registration with universal personal telecommunications services when said DECT telephone informs said fixed part of the DECT telephone's local area.

14. The system of claim 1, wherein:

said DECT telephone is configured to allow said user to optionally register for the universal personal telecommunication service.

15. The system according to claim 14, wherein said DECT telephone is configured to operate with an authentication module having contained therein a personal identification code, said personal identification code used for local authentication with said fixed part, said personal identification code being an only number needed by the user to initiate said registration, and further authentication with the fixed part and universal personal telecommunication service being performed by automatic communication between the DECT telephone and the fixed part, initiated by said DECT telephone.

16. The system of claim 1, wherein:

said DECT telephone is configured to operate with an authentication module having contained therein a personal identification code, said personal identification code used for local authentication with said fixed part, said personal identification code being an only number needed by the user to initiate said registration, and further authentication with the fixed part and universal personal telecommunication service being performed by automatic communication between the DECT telephone and the fixed part, initiated by said DECT telephone.

17. The system of claim 1, wherein:

said DECT telephone comprises,
  means for analyzing system information from a base station,
  means for obtaining access and locking the DECT telephone to a connection with the base station, said base station having means for sending a request message to the DECT telephone if universal personal telecommunication services are requested by said user, said DECT telephone also having
  means for answering said request message, and
  a storage mechanism configured to store the International Portable User's Identities, said fixed part comprising means for identifying a content of the International Portable User's Identities as a personal number associated with universal personal telecommunications services such that the DECT telephone and fixed part automatically attempt to initiate a registration procedure with the public switch telephone network.

18. The system of claim 17, wherein:

the DECT telephone, upon receipt of a positive acknowledgment, employs means for indicating to the user that a universal personal telecommunications services registration process is presently ongoing, and employs means for respectively providing an acknowledgment of completion or not completion of a successful or unsuccessful registration.

19. The system of claim 1 wherein:

said fixed part comprises a local data base having means for storing an identity of a user of the DECT telephone with a corresponding indication as to whether the user requests automatic registration with universal personal telecommunications services when said DECT telephone informs said fixed part of the new location area of the DECT telephone.

20. The system of claim 1, wherein:

upon entry into the new location area, the DECT telephone automatically initiates a registration with the fixed part resulting in a normal registration process with a local DECT system, said fixed part configured to request the personal identification code of the user on acceptance of the DECT telephone into the local DECT system and that upon providing the Portable Access Rights Key and International Portable User's Identities from the user, the DECT telephone being registered for universal personal telecommunications service.

* * * * *